Aug. 8, 1944.   H. F. KORS   2,355,307
PIE CRUST TRIMMING RING
Filed March 9, 1942
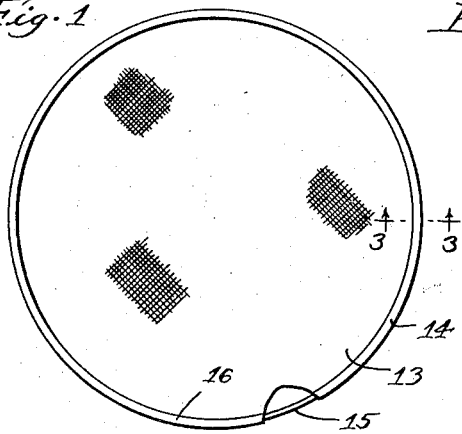
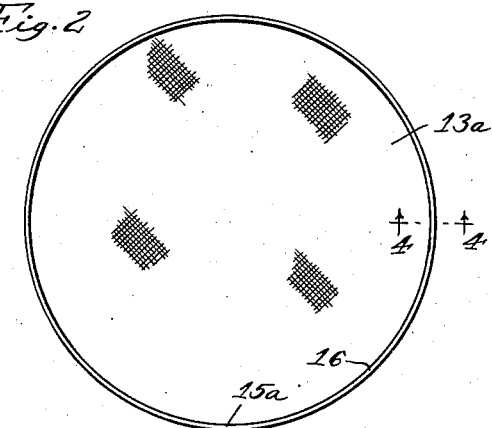
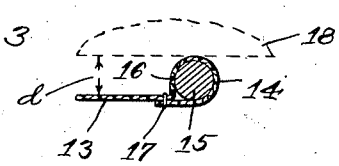
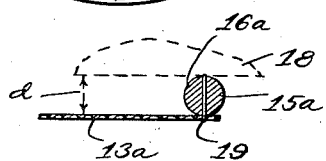
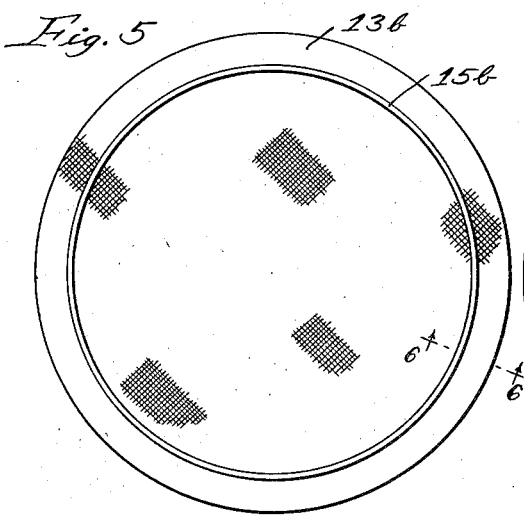
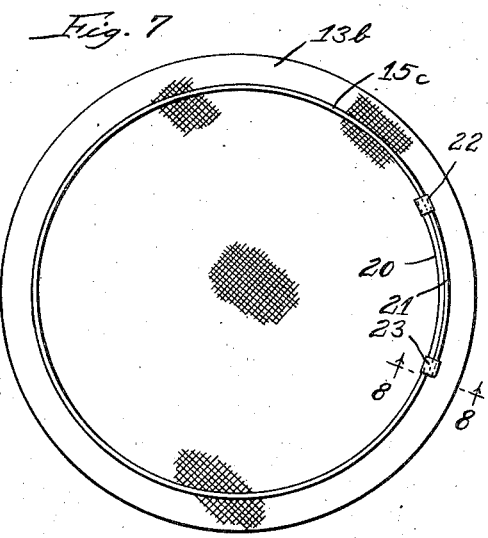
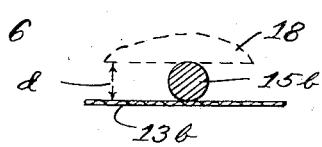
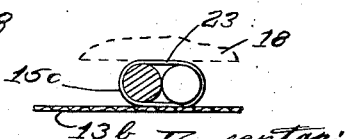
Inventor:
Henry F. Kors
By McCanna, Wintercorn & Morsbach
Attys.

Patented Aug. 8, 1944

2,355,307

UNITED STATES PATENT OFFICE 2,355,307

PIECRUST TRIMMING RING

Henry F. Kors, Chicago, Ill.

Application March 9, 1942, Serial No. 433,968

6 Claims. (Cl. 107—54)

This invention relates to a new and improved pie-crust trimming ring.

In the making of pies at home, the average housewife finds it quite difficult to roll out the dough to the desired size and shape and usually has to resort to patching, with the result that the finished pies do not present a neat and satisfactory appearance. It is, therefore, the principal object of my invention to provide a trimming ring by means of which the housewife can roll out a true disk of dough for the pie-crust, to the precise diameter and approximate thickness desired and all guesswork and need for patching is eliminated and no special skill is required.

The invention is capable of embodiment in various forms, but in the preferred forms the dough is rolled out over a piece of canvas, or the like, in or on which the trimming ring is provided so that the trimmed disk of dough is left on the canvas after the rolling operation and the canvas can be used in picking up the dough and placing it into the tin or over the pie, the canvas being peeled off the back of the dough at that time.

In all forms of the invention the circular ring, bead, or rib provides a pattern for guidance in rolling out the dough in various directions so as to work it into a circular disk form, and the rolling pin riding on the ring so defined rolls the dough to a substantially uniform thickness and any surplus is trimmed off by the ring as the pin rides thereon.

The invention is illustrated in the accompanying drawing, in which—

Figs. 1 and 2 are plan views of two pastry canvasses embodying the trimming ring of my invention;

Figs. 3 and 4 are enlarged sectional details on the correspondingly numbered lines of Figs. 1 and 2, indicating in dotted lines how the rolling pin is adapted to ride on the trimming ring;

Figs. 5 and 6 are views similar to Figs. 1 and 3 showing another form of the invention in which a separate ring is provided in conjunction with a pastry canvas;

Fig. 7 is a plan view of an adjustable ring, and

Fig. 8 is an enlarged sectional detail on the line 8—8 of Fig. 7.

Similar reference numerals are applied to corresponding parts throughout the views.

Referring first to Figs. 1 and 3, which illustrate the preferred form, the reference numeral 13 designates a substantially circular piece of canvas or other similar flexible material, the marginal edge portions 14 of which are folded over a trimming ring 15 and the free edge secured next to the circular bead 16 thus defined, as indicated at 17. The ring may be of heavy cord or other flexible material of sufficient thickness so that the bead 16 defined by the covered ring will be of a diameter from approximately $\frac{1}{16}$ in. to approximately $\frac{1}{8}$ in. in height. That dimension is indicated at $d$ in Fig. 3 between the pastry canvas 13 and the rolling pin, indicated in dotted lines at 18 as resting on the bead 16.

In using this device the housewife rolls the dough out over the canvas 13 in all directions to fit within the circular bead 16. Any excess that there may be will be trimmed off more or less automatically as the roller runs over the bead, the excess being left on the outside of the bead. The circular disk of dough can be placed in the pan or over the pie, depending upon whether it is destined for the bottom or top crust, and the canvas is peeled off the back thereof. The dough will be of substantially even thickness, and the resulting pie will present a much neater appearance because of the all around uniformity of the crust. All guesswork is eliminated and there is never any need for patching. Furthermore, no special skill is required in the use of this device, inasmuch as the housewife can easily roll the dough out using the bead 16 as a pattern to guide her. The handiness of the canvas in acting as a backing for the dough is also apparent when it is considered that in many cases when following the old method a properly rolled out piece of dough is distorted or torn in picking it up and transferring it to the pan.

In Figs. 2 and 4 the pastry canvas 13a has a ring 15a formed by a piece of heavy cord, or other flexible material, suitably secured directly onto the top thereof as by stapling or stitching the same, as indicatged at 19. In this case the ring 15a itself forms the circular bead 16a. The operation of this form will be substantially the same as that of Figs. 1 and 3.

In Figs. 5 and 6 a pastry canvas 13b is shown with a removable metal ring 15b that is adapted to be placed on the canvas and removed after the rolling and trimming operation, leaving the disk of dough on the canvas to be transferred to the pie tin or pie in the manner previously described. Otherwise the operation of this form is substantially the same as that of Figs. 1 and 3.

In Figs. 7 and 8 an adjustable ring 15c is shown, the ends 20 and 21 of which are overlapped and slidably interconnected by sheet metal loops 22 and 23, the loop 22 being welded to the end 20 and slidable on the end 21, and the loop 23 being welded to the end 21 and slidable on the end 20. This permits adjustment of the ring to different diameters to trim pie-crust to different diameters for different sizes of pies. The ring 15c, it will of course be understood, may be used like the ring 15b on a pastry canvas like that shown at 13b in Figs. 5 and 6, and, hence, the operation of this form will be substantially the same as that of Figs. 5 and 6.

It will be understood that in all of the forms the dimension *d* representing the thickness of the dough rolled out within the ring or bead is approximately the same.

It is believed the foregoing description conveys a good understanding of the objects and advantages of my invention. The appended claims have been drawn to cover all legitimate modifications and adaptations.

I claim:

1. The method of simultaneously rolling and trimming pie-crust dough, which consists in placing the dough on a piece of flat material within a ring of the diameter and approximate thickness of the disk of pie-crust dough desired, and then rolling out the dough within the ring to the approximate thickness of the ring and precise inside diameter of the ring and so that any excess is sheared off by the ring.

2. The method of rolling and trimming pie-crust dough and applying the rolled and trimmed dough to a pie tin, which consists in placing the dough on a piece of flat flexible material within a ring of the diameter and approximate thickness of the disk of pie-crust dough desired, then rolling out the dough within the ring to the approximate thickness of the ring and precise inside diameter of the ring and so that any excess is sheared off by the ring, and then applying the trimmed disk to the pie tin using the flexible material as a backing on which to transfer the dough, the flexible material being peeled from the back of the dough when the latter is in place on the tin.

3. A pie-crust rolling and trimming device comprising, in combination, a piece of flat flexible material at least as large as the diameter of the disk of pie-crust dough to be rolled thereon, and means defining a projecting trimming ring on the working face of said material of approximately the thickness and diameter of the pie-crust dough to be rolled and trimmed thereon, comprising a strip of flexible material extending in a circle on the marginal edge portion of the flat flexible material and secured thereto.

4. A pie-crust rolling and trimming device comprising, in combination, a piece of flat flexible material at least as large as the diameter of the pie-crust dough to be rolled thereon, and means defining a projecting trimming ring on said material of approximately the thickness and also the diameter of the pie-crust dough to be rolled and trimmed thereon, comprising a strip of flexible material describing a circle and having the marginal edge portion of the flat flexible material folded thereover and connected thereto so that the trimming ring thus defined on the flat flexible material projects upwardly from the top working surface of said flat flexible material.

5. The method of rolling pie-crust dough, which consists in defining the outline of the dough disk with a ring on the working surface used for rolling the dough, and then rolling the dough from the approximate center of said ring outwardly in all directions to the shape and inside diameter of the ring as well as the approximate thickness of the ring and removing any excess dough by shearing it off between the ring and roller as the dough is rolled out toward the ring.

6. The method of rolling pie-crust dough, which consists in defining the outline of the dough disk with a ring on the working surface of a piece of flat flexible material used for rolling the dough, then rolling the dough from the approximate center of said ring outwardly in all directions to the shape and inside diameter of the ring as well as the approximate thickness of the ring and removing any excess dough by shearing it off between the ring and roller as the dough is rolled out toward the ring, and finally removing the rolled out disk of pie-crust dough from the piece of flat flexible material by peeling off the flexible material from the back of the disk of pie-crust dough when the latter is in place on the tin.

HENRY F. KORS.